United States Patent [19]
Goltsos

[11] 3,974,358
[45] Aug. 10, 1976

[54] PORTABLE FOOD HEATING DEVICE
[75] Inventor: Costas E. Goltsos, Weston, Mass.
[73] Assignee: Teckton, Inc., Wellesley, Mass.
[22] Filed: Jan. 10, 1975
[21] Appl. No.: 540,080

[52] U.S. Cl. ............................. 219/387; 99/374; 206/541; 219/404; 219/411; 219/521; 219/525
[51] Int. Cl.² .................................. F27D 11/02
[58] Field of Search ............ 219/385, 386, 387, 388, 219/405, 411, 521, 524, 525, 444, 446, 447, 430, 438, 439, 441; 126/246; 206/72, 541; 220/20; 99/374, 389

[56] References Cited
UNITED STATES PATENTS

| | | | |
|---|---|---|---|
| 2,820,131 | 1/1958 | Kodama | 219/388 |
| 2,860,225 | 11/1958 | Stein | 219/411 X |
| 3,122,265 | 2/1964 | Innis | 206/541 X |
| 3,140,389 | 7/1964 | Windas | 219/447 |
| 3,180,973 | 4/1965 | Wanielista et al. | 219/388 |
| 3,244,859 | 4/1966 | Whiteford | 219/405 X |
| 3,249,741 | 5/1966 | Mills | 219/388 |
| 3,275,329 | 9/1966 | Lieberman et al. | 206/72 X |
| 3,304,406 | 2/1967 | King | 219/411 |
| 3,515,854 | 6/1970 | Williams | 219/388 |
| 3,610,884 | 10/1971 | Evans | 219/439 |
| 3,648,019 | 3/1972 | Brewitz | 219/386 |
| 3,678,248 | 7/1972 | Tricault | 219/525 |
| 3,746,837 | 7/1973 | Frey et al. | 219/387 |
| 3,805,018 | 4/1974 | Luong et al. | 219/387 |
| 3,829,654 | 8/1974 | Eisler | 219/386 |
| 3,836,751 | 9/1974 | Anderson | 219/411 |
| 3,845,875 | 11/1974 | Douglas et al. | 220/20 |

FOREIGN PATENTS OR APPLICATIONS

| | | | |
|---|---|---|---|
| 639,835 | 7/1950 | United Kingdom | 219/387 |

*Primary Examiner*—Volodymyr Y. Mayewsky
*Attorney, Agent, or Firm*—Wolf, Greenfield & Sacks

[57] ABSTRACT

A complete prefrozen meal is placed in a combination heating-serving container. The meal is composed of a plurality of different food items which require different quantities of heat in order to bring each of them to their intended serving temperature. The combination heating-serving container includes self-contained means associated with each food item to be heated to apply the desired quantity of heat to the food items within the same time interval. The container also includes means for isolating each of the food items from each other during the heating process. The container is thermally insulated and also includes means operable by the user to begin the heating cycle when he so desires.

13 Claims, 6 Drawing Figures

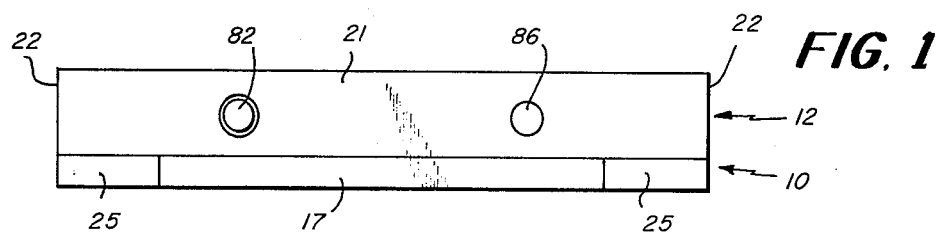
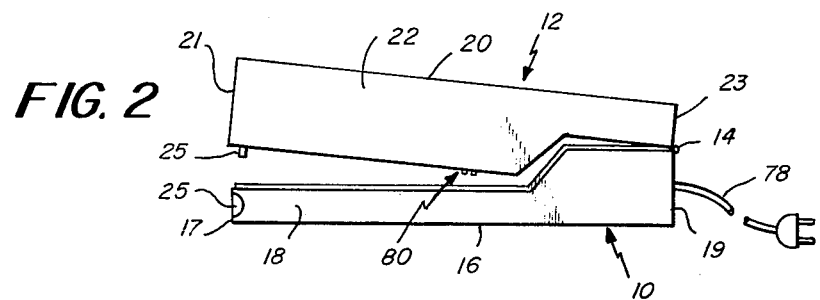
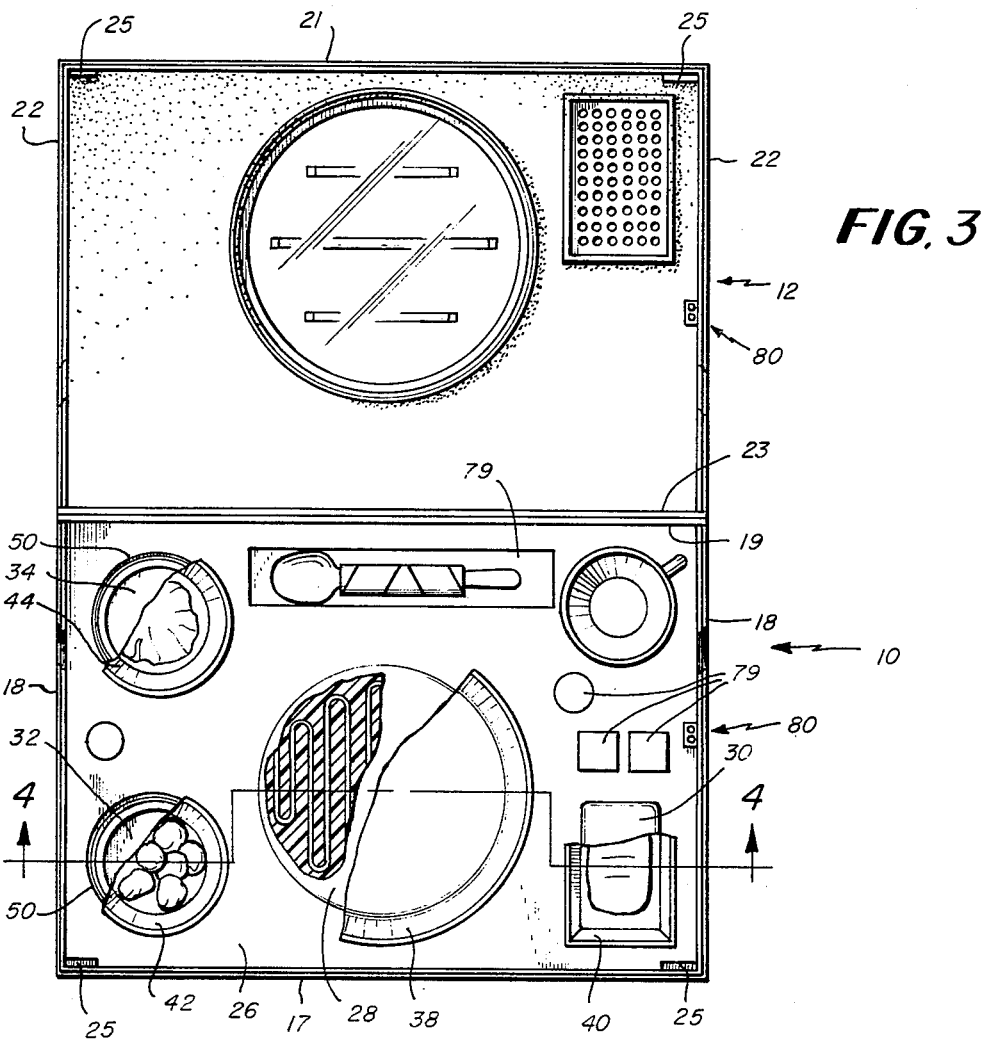

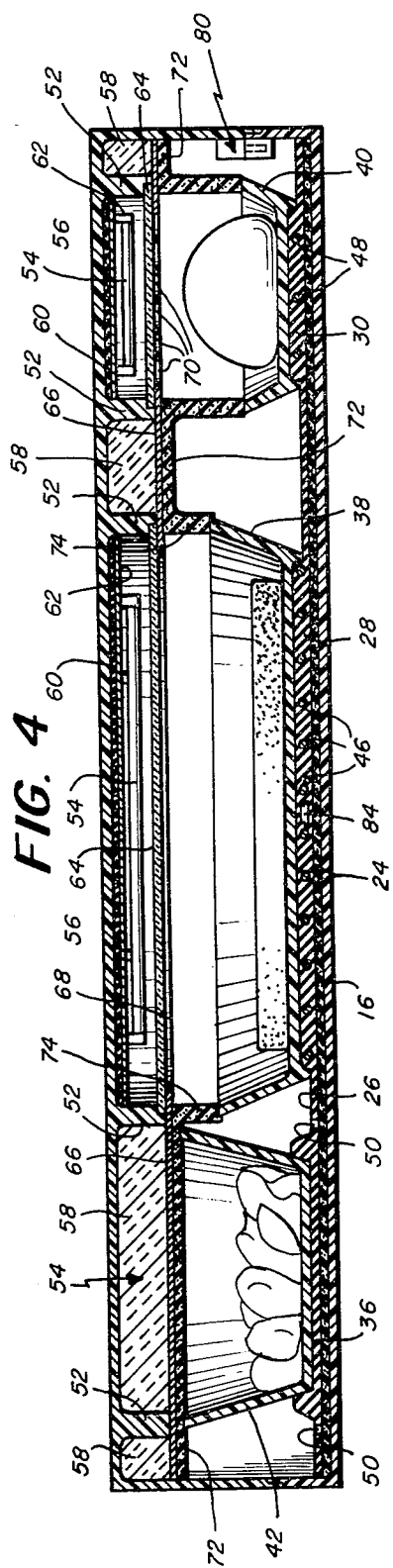
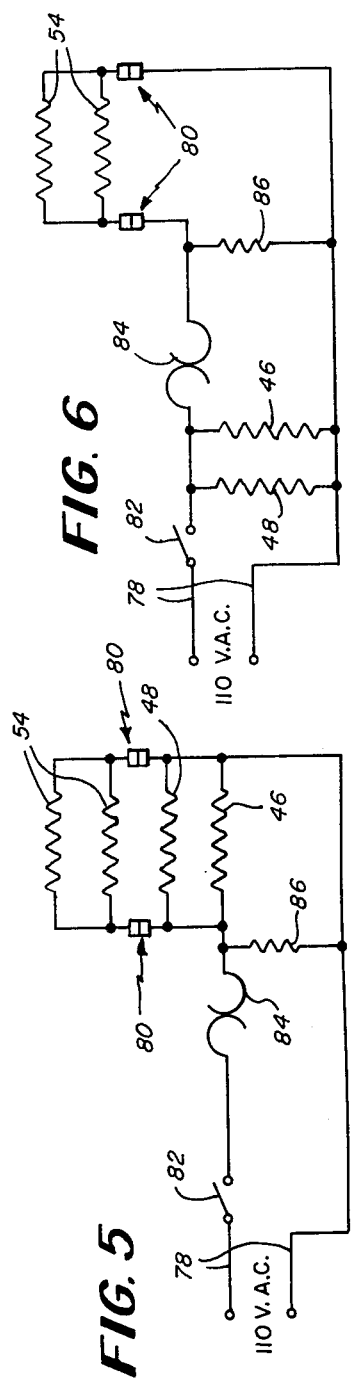

PORTABLE FOOD HEATING DEVICE

BACKGROUND OF THE INVENTION

This invention relates to an improved device for heating within the same time interval prefrozen and/or refrigerated meals composed of a plurality of food items and in which the quantity of heat applied to each of the individual food items is selectively controlled so that after the time interval all of the food items in the meal will be at their intended serving temperatures. While such feeding techniques are gaining increasing acceptance in various mass feeding environments such as institutional cafeterias, hospitals, schools, etc., there are some instances where the prior techniques may be somewhat inconvenient. For example, typical procedures currently employed are to prepare and serve such meals all at the same time. However, there are instances where the person being served may not wish to eat at that time. Where the meal is intended to be served hot, he will either eat the meal before he is ready or, if he waits until it is more convenient, the meal may become cold. For example, such instances may be encountered in airlines and hospitals which have a somewhat fixed "meal time" which may not coincide with the needs or desires of some of the individuals being served. It is among the general objects of the invention to provide a serving device having self-contained heating means which is operable by the person being served so that he may control the time of preparation of the meal to suit his particular individual schedule.

SUMMARY OF THE INVENTION

The serving-heating container of the invention includes a bottom section and an openable or removable cover both of which are thermally insulated. The bottom section supports a number of plates, bowls, etc., which hold the individual food items in predetermined relative locations in the bottom section. Most, if not all, of the food items typically will be prefrozen and/or prerefrigerated in their respective plates or bowls which then are placed in the insulated container to maintain them at their low temperature. The cover for the container includes wall segments which extend away from the cover and define a configuration such that when the cover is closed the wall segments will engage the rims of the plates or bowls to isolate the contents of each plate or bowl from the contents of the others. The cover also includes radiant heating means selectively placed with respect to the predetermined locations of one or more of the plates or bowls and means for selectively controlling the amount of radiated heat to which each of the individual food item is exposed, thereby controlling the extent to which each of the food items is heated within a given time interval. The electrically operated radiating elements are connected, by suitable wiring to a convenient electrical outlet. A user operable switch is provided on the exterior of the container to begin the heating cycle when desired. The food items will be heated until they have reached a predetermined temperature which is sensed by a thermostatic control in the container which disconnects the heating elements from the power source when the predetermined temperature has been reached. The thermostatic control may turn off all of the power to the heating elements or, alternatively, may shut off all but a portion of the power so that the remaining, reduced power level may maintain the food items in a warm condition.

As mentioned above, the food tiems of which the meal is composed ordinarily will be precooked and then frozen or refrigerated in the device. The foods preferably are slightly undercooked so that when heated to the proper serving temperature the added heat may complete the cooking process. Because the step of heating the prefrozen and/or prerefrigerated dinner both heats the food to its serving temperature and also may partially cook the food, the application of heat is referred to herein as "heat conditioning".

It is among the primary objects of the invention to provide an improved device which enables a complete meal composed of a plurality of food items to be heat conditioned simultaneously and in a manner in which all of the food items are brought to their proper serving temperatures within the same time interval.

A further object of the invention is to provide a device of the type described in which the heat conditioning of the meal may be effected at a time within the individual's control and in a manner which suits his particular schedule.

A further object of the invention is to provide a combination serving-heating device having self-contained heating means controllable by the user.

DESCRIPTION OF THE DRAWINGS

The foregoing and other objects and advantages of the invention will be appreciated more fully from the following further description thereof, with reference to the accompanying drawings wherein:

FIG. 1 is a front elevation of the heating-serving container in a closed configuration;

FIG. 2 is a side elevation of the container with the cover partly opened;

FIG. 3 is a plan view of the container as it would appear with the cover opening fully 180°;

FIG. 4 is a sectional elevation of the container as would be seen along the line 4—4 of FIG. 3 with the container in a closed configuration;

FIG. 5 is a schematic diagram of the electrical circuitry associated with the container; and FIG. 6 is a modified electrical circuit which may be employed in the invention.

DESCRIPTION OF THE PREFERRED EMBODIMENT

The container includes a lower section, indicated generally by the reference character 10 and an upper section, indicated generally by the reference character 12. The sections 10, 12 may be fabricated from any suitable material and, for example, may be molded from an appropriate high impact plastic. Sections 10, 12 are made to form a complete enclosure which may conveniently be opened, as by hinging the upper section 12 to the lower section 10, at hinge 14. The lower section 10 includes a bottom wall 16, upwardly extending sidewalls 18, a front wall 17 and rear wall 19. The upper section 12 similarly has a top wall 20, downwardly extending sidewalls 22, a front wall 21 and rear wall 23 which mate with the upper edges of the walls 17, 18, 19 of the lower section 10. It may be desirable to form the front wall 17 and forward regions of the sidewalls 18 so that they are of reduced height as shown so as not to interfere with access to the meal within the lower section. The container may include latches indicated generally at 25 at the front corners of the device to enable the upper and lower sections to be locked together.

The container is thermally insulated and, to this end, the inner surface of bottom wall 16 is provided with a layer of foam insulation 24 which, for example, may be fabricated from silicon rubber which is capable of withstanding the temperatures developed within the device, as will be described. The sheet of foam insulation 24 is covered by an interior layer of solid silicon rubber 26. In the illustrative embodiment of the invention, layer 26 may be provided with a plurality of raised pad portions 28, 30 and/or sockets 32, 34 which may be molded integrally with the silicon layer 26. The pads 28, 30 are disposed at selected locations over the bottom wall and each is designed to cooperate with the bottom of a bowl or dish, such as 38, 40, 42, 44 to engage the bowl or dish and retain it in its predetermined location within the lower section 10. The raised pad configuration is preferred in connection with those of the bowls or dishes which are intended to contain foods requiring somewhat more heat conditioning than other of the foods in the meal. The raised pad provides ample thickness in which electrical resistance heating elements 46, 48 may be embedded to provide additional conductive heating through the bottom wall of its associated dish or bowl. For example, the main dish 48 which typically might contain frozen meat would have the underside of its bottom wall formed in a configuration which will fit snugly and in close surface contact with the area of the raised pad 28 as shown in FIG. 4. Operation of the resistance heating element 46 within the pad 28 will cause heat to be conducted through the silicon rubber and through the bottom wall of the main dish to conductively heat the meat. In this regard, it should be noted that the bowls and dishes preferably are heat conductive and may be fabricated from a suitable heat conductive ceramic or plastic material. The length and/or number of resistance heating elements will depend on the amount of heat required by the food item in the particular bowl. For example, where the dish 40 might contain frozen bread which would require somewhat less heating, the resistance elements 48 may be selected to develop a reduced quantity of heat.

Those of the dishes or bowls which contain food items which are not to be heated would have no resistance elements associated therewith. For example, bowl 42 may be intended to contain salad and bowl 44 may contain a cold dessert. Depending on the heat transfer characteristics of the solid silicon rubber material employed in the layer 26, it may be desirable to provide some discontinuity between the heated portion of the layer and those regions which surround the bowls or dishes which are not to be heated. For example, separation slots or grooves 50 may be formed in the layer 26 where it surrounds the regions of the dishes or bowls 42, 44.

The upper section 12 of the device includes radiant heating means which, when the container is closed, may be actuated to heat the food items container within from the top. To this end, the upper section 12 is formed to define a plurality of downwardly extending walls 52, each of the walls being located on the top wall 20 so that when the device is closed, the walls 52 will define a configuration generally corresponding to that of the dish or bowl which it will overlie. The walls 52 thus define cavities 54 in which may be mounted infrared heating elements 56. The infrared heating elements 56 are located only in those of the cavities 54 which overlie a food item to be heated and the number and size of the heating elements 56 are selected accordingly. The other of the cavities preferably are filled with foam silicon rubber insulation 58. The cavities 54 which contain the radiant heat elements 56 preferably are also provided with an insulative foam layer 60 and the downwardly facing surface of the foam layer 60 is preferably provided with a reflective surface such as metallic foil 62 to reflect radiant energy downwardly toward its associated food item. Those cavities 54 which house the radiant heating elements 56 are enclosed at their downwardly facing regions by a sheet of tempered transparent high temperature glass 64 which may be secured by any suitable means to the wall portion 52 which defines that cavity. A sheet of stainless steel 66 overlies the downwardly facing region of the upper section 12 and may be secured to the ends of the wall sections 52. The stainless steel sheet 66 is provided with apertures 68, 70 which are disposed over the dishes containing food items to be heated to permit the radiant heat to pass through the glass 64 and to the food. The size and shape of the apertures controls the amount of radiation which will be transmitted to the food items below. For example, the aperture 68 which overlies the main dish which will usually contain meat or the like and requires a relatively large quantity of heat will be substantially open, large aperture. The plurality of small apertures 70 which overlie the dish containing bread provide a partial shield for the bread which requires less heat conditioning. The portion of the stainless steel sheet 66 is free from any apertures.

During the heat conditioning process, it is desirable to isolate each of the food items from each other to retard migration of heat, water vapor and food odors from one food compartment to the next. To this end, the outwardly facing surface of the stainless sheet 66 may be provided with a layer 72 of foam silicon rubber, having heat insulative properties. The foam layer 72 extends over the unapertured portion of the stainless steel sheet 66 and is of a thickness which is selected with reference to the height of each of the bowls and dishes so that when the device is closed, the portion of the foam sheet 72 will engage snugly the upper rim of each of the food containers. Thus, the foam sheet 72 may include a downwardly extending wall 74 which engages the rim of the main dish and may include a downwardly extending wall 76 which, when the container is closed, engages the rim of the dish 38. Where the bowls are of somewhat greater depth than those indicated at 38, 40, such as the bowls 40, 42, the sheet 72 may not need any downwardly extending portions and it thickness itself may be sufficient to engage the rim of the bowl as shown.

The bottom section 10 may also be formed to include depressions indicated generally at 79 to receive condiments and eating utensils or the like. The depressions 79 may be formed in the silicon rubber layer 26 and may be dimensioned to receive preselected small condiment containers or the like. When the device is closed and the heat conditioning process is in progress, these regions are isolated from the heated compartments by the engagement of the foamed silicon rubber layer 72 and its projecting walls 74 with their respective food dishes or bowls.

The device may be plugged into any convenient electrical outlet and has a power cord 78 which may extend from the rear lower section 10. As shown in FIG. 5, in one embodiment the power cord is connected to the electrical resistance elements 46, 48 through wires which may be embedded in the solid silicon rubber layer 26. The overhead radiant heating elements 54 may be connected to the power source through a connector 80 secured to the sidewalls 18, 22 which connect the infrared heating elements in circuit when the device is closed as suggested in FIG. 2. The heat conditioning cycle is begun by actuating a start switch 82 which connects the heating elements to the power supply. The device may include a light 86 mounted at the front wall 21 which indicates the heating is in progress and which shuts off when the heat conditioning has been completed. The individual foods within the container will be exposed selectively to different quantities of heat. The food thus will be heat conditioned until a thermostat 84 which is embedded in the silicon rubber layer 26 just beneath the upper surface of the pad is triggered. The thermostat 84 is actuable when its temperature has reached a predetermined level at which time the various food items within the device will have been fully heat conditioned. The thermostat 84 may be connected to completely shut off all further power to the device as shown in FIG. 5. Alternatively, the thermostat 84 may be connected between some of the resistance and infrared elements as shown in FIG. 6 to shut off some of the heating elements and to enable some of the resistance heaters 46, 48 to continue to operate. This latter configuration may be employed to maintain the food in a warm condition for an extended period of time after the food has been fully heat conditioned but without causing any further significant cooking.

In use, the various dishes, bowls, etc. each carrying a predetermined component food are placed in the device in their proper predetermined locations. The dishes may be filled with the component foods which may have been prefrozen or refrigerated in readiness for use. In some instances in which the particular component food is one which does not lend itself to long storage periods, such as salad, the salad may be prepared fresh and inserted into the device shortly before the container is loaded. If desired, the various eating utensils as well as condiments and the like also may be placed in the container at this time. The device then may be closed and locked and brought to the person being served. It is then plugged into a convenient electrical outlet and the heat conditioning may be initiated by the user when he desires and to fit his personal schedule.

It should be understood that the foregoing description of the invention is intended merely to be illustrative thereof and that other embodiments and modifications may be apparent to those skilled in the art without departing from its spirit.

Having thus described the invention, what is claimed is:

1. A heating device for simultaneously heat conditioning a plurality of foods comprising:
   a portable box having upper and lower thermally insulating sections;
   a resistance heating element in the lower section;
   an infrared radiant heating element in the upper section;
   means for retaining a plurality of food bearing dishes in the box, in a manner in which at least one of the food bearing dishes is disposed between the resistance and infrared heating elements and in heat conductive relation with the resistance heating element;
   shielding means carried by the upper section and located as to be disposed between the infrared heating element and said one of said food bearing dishes for controlling the quantity of radiation to which the food in said food bearing dish is exposed; and
   means on the upper section for engaging the upper rim of at least one of the food dishes to isolate each of the foods in the food dishes from each other.

2. A device for heat conditioning a meal composed of a plurality of food components comprising:
   a housing having separable upper and lower thermally insulating sections which are combinable to define a complete enclosure;
   the lower section having an internal bottom surface formed from a heat conductive material and being contoured to receive a plurality of dishes in predetermined locations and in heat conductive relation therewith, each dish having a separate food component therein;
   electrical resistance heating means mounted in the heat conductive material of the bottom surface at selected of the predetermined locations;
   radiant heating means mounted to the upper section at locations which will be disposed above said selected of said predetermined locations of the dishes when the sections are combined;
   means on the upper section for covering and isolating, individually, each of the food bearing dishes from each other; and
   circuit means for operating both the electrical resistance heating means and the radiant heating means for predetermined temperature setting.

3. A device as defined in claim 2 further comprising:
   each of the radiant heating means being enclosed within a compartment defined in part by the upper section, each of said compartments being enclosed in part by a radiation transparent, heat resistant sheet at its interiorly facing surface.

4. A device as defined in claim 3 further comprising:
   at least one of the compartments enclosing the radiant heating means having a reflective shield covering the radiation transparent sheet, the shield having at least one radiation transparent opening formed therethrough.

5. A device as defined in claim 2 wherein the isolating means comprises:
   the inwardly facing surface of the upper section being formed in part from a resilient, foam insulative material being constructed and arranged and dimensioned with respect to the dishes located in the predetermined locations to engage the rim of the dishes when the upper and lower sections are combined.

6. A device as defined in claim 2 wherein the circuit means includes thermostatically controlled means for disconnecting the power source from each of the resistance and infrared heating elements.

7. A device as defined in claim 2 wherein the circuit means comprises:
   means for thermostatically disconnecting at least some of the infrared heating elements after a predetermined time interval and for continuing operation of at least some of the resistance heating elements.

8. A device as defined in claim 2 further comprising:

the circuit means including an indicator light connected in circuit with the heating means and being constructed and arranged as to indicate when the food is heated.

9. A device as defined in claim 2 further comprising:
electrical connector means secured to the upper and lower sections and being connectable automatically when the upper and lower sections are closed to connect the infrared heating elements in circuit.

10. A device for heat conditioning a meal composed of a plurality of food components comprising:
a housing having upper and lower thermally insulating sections combinable to define a complete enclosure, the upper and lower sections being hinged to each other;
an insulative sheet covering the bottom of the lower section;
a heat conductive sheet covering the insulative sheet, the heat conductive sheet being contoured to receive and engage the bottoms of a plurality of dishes and to retain the dishes in predetermined locations and in heat conductive relation with the head conductive sheet;
electrical resistance heating means embedded in the heat conductive sheet of the lower section;
the upper section being formed to define a plurality of inwardly facing compartments;
radiant heating means mounted within selected of the compartments;
those of said compartments having the radiant heating means mounted therein including a radiation transparent window covering each of said compartments to enclose the radiant heating means therein;
a reflective shield covering all of said compartments, said reflective shield having radiation transport apertures formed in those regions thereof which overlie the compartments containing the radiant heating means, the radiation transparent apertures in the shielding means being of dimensions and number to selectively vary the mount of radiant energy which may pass therethrough; and
an insulative, resilient sheet covering the reflective shield on the upper section, the insulative sheet being constructed and arranged to engage the upper rim of each of the dishes in the lower section when the upper and lower sections are closed.

11. An apparatus as defined in claim 10 further comprising:

each of the compartments in the upper sections which contain radiant heating means therein having an insulative sheet covering the innermost surface of the compartment and a reflective sheet covering said insulative sheet.

12. A device for heat conditioning a meal composed of a plurality of food components comprising:
a housing having upper and lower thermally insulating sections combinable to define a complete enclosure;
a layer of insulative material extending over the bottom of the lower section;
a layer of heat conductive material covering the layer of insulative material, the heat conductive layer being contoured to receive and engage the bottoms of a plurality of dishes and to retain the dishes in predetermined locations and in heat conductive relation with the layer of heat conductive material;
electrical resistance heating means in heat conductive contact with the layer of heat conductive material in the lower section at each of the predetermined locations;
the upper section being formed to define a plurality of inwardly facing compartments;
radiant heating means mounted within selected of the compartments;
those of said compartments having the radiant heating means mounted therein including a radiation transparent window covering each of said compartments to enclose the radiant heating means therein;
a reflective shield covering all of said compartments, said reflective shield having radiation transparent apertures formed in those regions thereof which overlie the compartments containing the radiant heating means, the radiation transparent apertures in the shielding means being of dimensions and numbered to selectively vary the amount of radiant energy which may pass therethrough; and
means for isolating the interiors of each of the dishes from each other at least when the upper and lower sections are combined.

13. A device as defined in claim 12 wherein the means for isolating the interiors of said dishes comprises:
means cooperative between the upper section and the upper rim of each of the dishes for effecting a seal closing over the top of each of said dishes.

* * * * *